United States Patent [19]

McGlew et al.

[11] Patent Number: 4,515,150
[45] Date of Patent: May 7, 1985

[54] BUILDING STRUCTURE AND BUILDING PANEL AND METHOD OF CONTROLLING APPEARANCE AND LIGHTING OF A BUILDING

[76] Inventors: John J. McGlew; John J. B. McGlew, Jr., both of P.O. Box 823, Tuxedo Park, N.Y. 10987

[21] Appl. No.: 502,182

[22] Filed: Jun. 8, 1983

Related U.S. Application Data

[63] Continuation of Ser. No. 121,808, Feb. 15, 1980, abandoned.

[51] Int. Cl.³ .............................................. F24J 3/02
[52] U.S. Cl. .................................. 126/445; 126/428; 126/431; 47/17; 52/305
[58] Field of Search ............... 126/444, 431, 900, 445, 126/450, 428; 47/17; 52/171, 173 R, 304, 204, 305, 306, 788

[56] References Cited

U.S. PATENT DOCUMENTS

| | | | |
|---|---|---|---|
| 2,439,553 | 4/1948 | Winn | 126/900 X |
| 3,107,052 | 10/1963 | Garrison | 126/900 X |
| 3,981,294 | 9/1976 | Deminet et al. | 126/900 X |
| 3,996,918 | 12/1976 | Quick | 126/450 X |
| 4,108,373 | 8/1978 | Chiapale et al. | 126/900 X |
| 4,210,128 | 7/1980 | Mattson | 126/900 X |

*Primary Examiner*—Larry Jones

*Attorney, Agent, or Firm*—McGlew and Tuttle

[57] ABSTRACT

A construction device comprises a panel which may be used for a structural member in either an interior or exterior wall and which has a side with a transparent wall. The transparent wall forms an exposed exterior surface. A chamber is defined behind the exterior surface either directly adjacent it or spaced therefrom. A fluid is positioned in the space and is selected for the characteristic that is to be imparted to the space, for example it may be of a particular color, insulation characteristic, heat transfer characteristic, reflection characteristic, light absorption characteristic, strength characteristic, shielding characteristic either in respect to magnetic, electronic or heat conditions, etc. The arrangement is such that when the fluid is behind the transparent wall it permits the wall to be used for example as a solar panel or as a transparent window panel if desired. In addition the fluid may contain a color which may change the appearance of the wall as visible through the transparent face and in fact many desirable characteristics may be imparted to the surface and these characteristics may be readily changed. By constructing the panel so that it is connected to a pump for circulating the fluid through it the constructional device may be used either as a sun shield or sun heat absorber or it may be used as a decorative interior wall or as an exterior building surface which may have its color characteristic changed regularly.

11 Claims, 7 Drawing Figures

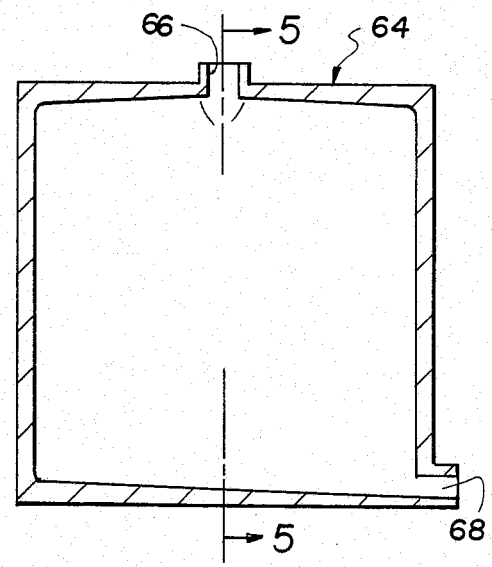
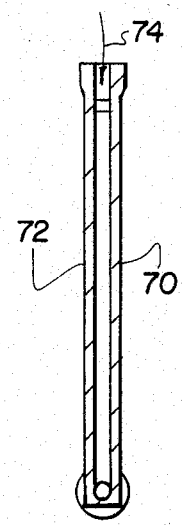
FIG. 4
FIG. 5
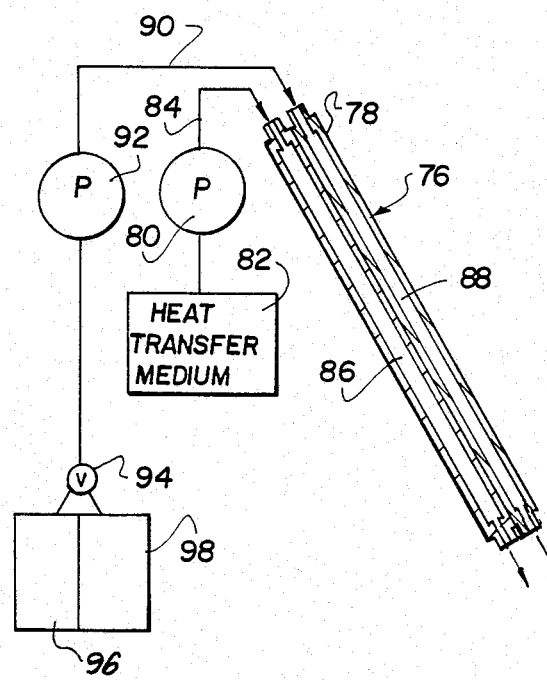
FIG. 6

BUILDING STRUCTURE AND BUILDING PANEL AND METHOD OF CONTROLLING APPEARANCE AND LIGHTING OF A BUILDING

This is a continuation of application Ser. No. 121,808 filed Feb. 15, 1980, now abandoned.

FIELD AND BACKGROUND OF THE INVENTION

Field of the Invention

This invention relates in general to construction devices and building structures and in particular to a new and useful construction device and method of conditioning a structure surface.

Building structures are known in which the transmission of heat or light therethrough can be varied by placing additional objects over the surface or behind the surface or by shifting the structural panels so that they are oriented either to receive the light or to be in a position such that they reflect it or block it. In addition such structures may be associated with shutters or other deflectors for varying the characteristics of the surface as well as for varying the sun rays which are received by the surface or reflected thereby. A disadvantage of the known structures is that they are usually arranged in a fixed orientation and the characteristics of the structures cannot be changed very easily and without great expense.

SUMMARY OF THE INVENTION

In accordance with the present invention there is provided a construction device which advantageously comprises a panel which may be used as a structural or ornamental member on either the interior or exterior of a building or similar structure and which will have a characteristic such that its heat light and appearance may be changed without changing the position of the structure and without adding screening or deflection elements. In its simple form the construction device comprises a panel member having a side with a transparent wall with an exposed exterior face and has on its opposite side a chamber either directly adjacent the face or spaced therefrom. The chamber is connected to a system for selectively positioning a fluid in the chamber which becomes visible througe the transparent outer wall of this panel member and either changes its appearance or its characteristics in respect to heat or light absorption or reflection. For example, the chamber may be filled with a dark substance so as to cause light which passes through the reflective outer space to be blocked so that it does not penetrate through the structure. If a clear substance such as a gas or a liquid is positioned in the chamber then the whole structure will be completely transparent and will pass rays such as heat or sun rays therethrough. In addition the chamber may be used to contain a substance which will influence the configuration or ornamentation of the panel to change its color, its heat or light absorbing or reflection characteristics or for any number of design as well as functional purposes in a structure.

In accordance with the invention method a structural panel is conditioned so as to provide a selected surface effect in respect to heat transfer and/or appearance by directing a fluid into a chamber defined interiorly of a transparent wall so as to change the characteristic of the structure for example by changing its visual characteristics or its heat or light absorbing characteristics.

Accordingly it is an object of the invention to provide a construction device for use in making interior and exterior walls which comprises a panel having a side with a transparent wall with an exposed exterior face and with at least one chamber behind the face along with a device for positioning a fluid in the chamber so as to provide a selected characteristic of the face. With the method of the invention the fluid is directed into the chamber behind the transparent face so as to impart a selected characteristic which is visible through this transparent face and where desired one or more different fluids may be circulated either in exchange or in addition to the first fluid for the purpose of varying the characteristic.

A further object of the invention is to provide a structural surface which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 4 is a transverse sectional view of another embodiment of a panel;

FIG. 5 is a section taken along the line 5—5 of FIG. 4;

FIG. 6 is a schematic sectional view of a solar panel constructed in accordance with the invention.

DETAILED DESCRIPTION OF PREFERRED EMBODIMENTS

Figure 1:
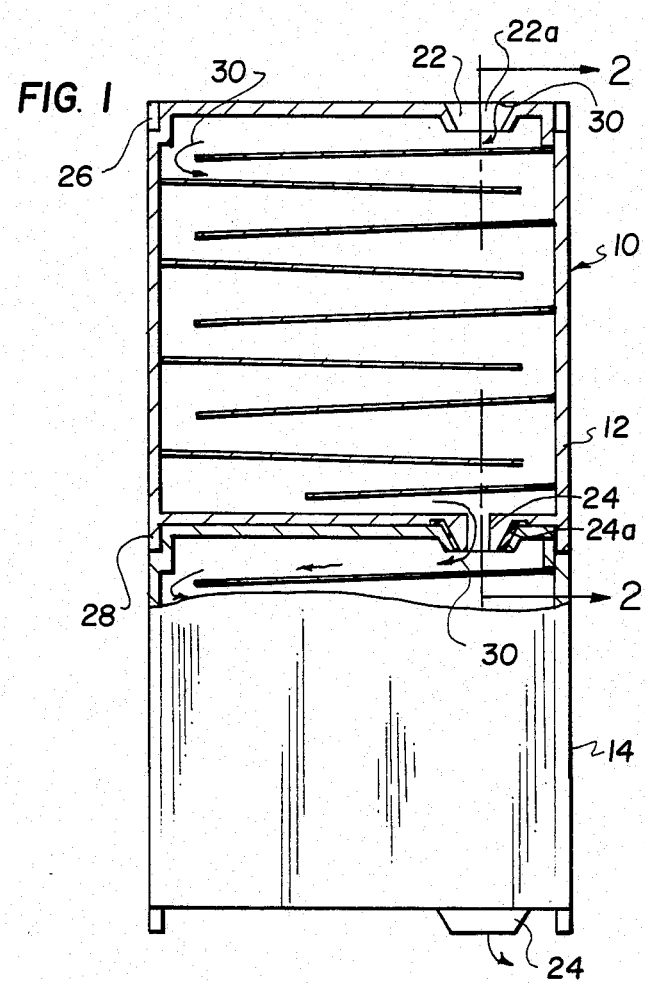
FIG. 1 is a front perspective view of an assembly of two panels constructed in accordance with the invention.

Referring to the drawings in particular, the invention embodied therein comprises a constructional device generally designated 10 as shown in FIG. 1 which in the embodiment shown comprises an assembly of individual panels 12 and 14 which may be interfitted in order to form a large interior or exterior building wall structure.

In accordance with the invention, each panel or device 12 includes a side with a transparent wall 16. This transparent wall 16 forms a surface which for example may be exposed to solar radiation as indicated by rays 18 or it may be simply positioned on the inside of a building and form a finished structural wall. A solar radiation wall may for example be a side or vertical wall or a top roof wall which may be either inclined or horizontal. In accordance with a feature of the invention at least one chamber 20 is defined either immediately behind the wall 16 or at a location spaced behind this wall as shown in the example of FIGS. 1 and 2.

Each of the panels 12 and 14 include inlets 22 at one end and discharges 24 at an opposite end. Each inlet is formed with a frusto-conical receiving surface 22a into which an outer frusto-conical surface 24a of the next adjacent panel is projected so as to interfit the panels together. In addition each device or structure 10 includes corner recesses 26 at their one ends and corner projections 28 which fit into the recesses of the next adjacent panels at their opposite ends. Any number of such panels may be interconnected in a vertical wall formation or a horizontally extending wall arrangement as desired. Combinations of horizontal and vertically interfitting panels may be made by shifting the locations of the inlets and outlets from the top and bottom walls to the side walls as necessary.

In accordance with a further feature of the invention a fluid is either positioned in the chamber 20 or it is directed into the chamber by circulating means or pumping means connected to a first inlet 22 and to a last outlet 24. The fluid passes in the direction of arrows 30 from one panel structure or device 10 to the next. In the embodiment shown in FIGS. 1 and 2 the device is shown as being equipped with means for circulating the fluid through the chamber 20 for the purpose of varying the characteristic of the panel as desired for example to change its color, its insulation characteristics, its heat transfer characteristics or its heat shielding characteristics. For example, when it is desired to increase the heat absorption characteristic of the surface 16 the fluid is chosen which will produce a heat absorbing characteristic. For such purposes a fluid which is of a dark color or which may have metallic particles therein for absorbing heat or a dark gas or even a magnetic type substance which may subsequently be attached from one side to the other for the purpose of aligning particles for example horizontally so that they form a light passage therethrough or forming them into a grid so that they obscure the passage of light. Such substances for example as fiberglas which may be acted upon electronically to change the light penetration through the chamber 20 would be of use for varying the heat penetration characteristics through the device. In the embodiment shown, the walls of the chamber on each side thereof, namely walls 32 and 34, are advantageously made light transmissive so that the entire panel may be made completely light transmissive when one fluid is circulated therethrough or even made opaque by circulating a fluid which will have such characteristics. The wall 34 in some instances may advantageously be made opaque and be a structural reinforcing wall.

Figure 2:
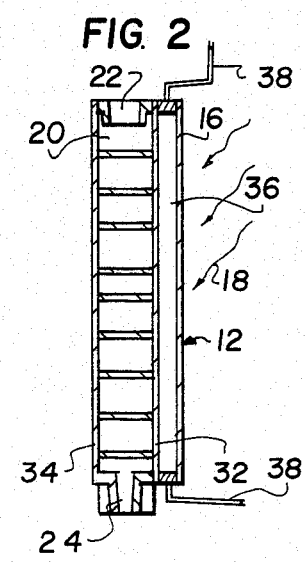
FIG. 2 is a section taken along the line 2—2 of FIG. 1.

Also as shown in the embodiment of FIGS. 1 and 2, the second chamber 36 may advantageously be defined between the wall 32 and the exterior wall 16. This chamber may be used for the passage of a heat transfer medium therethrough where it is desired for example to heat the medium by solar rays 18 and then circulate it through a room space or other area for heat transfer purposes. For this purpose a connection line 38 is advantageously made to provide means for circulating a heat transfer medium therethrough. The connecting line 38 advantageously comprises a heat transfer circuit having suitable heat exchange or other devices for pre-heating water, room air, etc.

Figure 3:
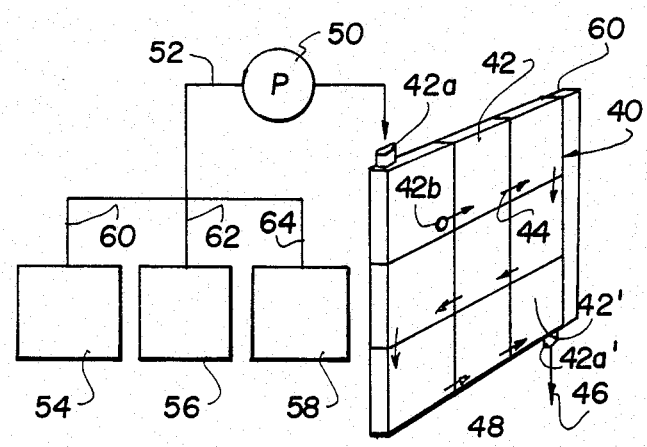
FIG. 3 is a perspective view of an assembly of panels constructed in accordance with the invention.

In the embodiment shown in FIG. 3, there is indicated a wall structure generally designated 40 made up of a plurality of panels 42. Each of the panels 42 has an inlet connection which are advantageously oriented on a top wall and a side wall respectively so that a characterizing fluid may be circulated therethrough as indicated by the arrows 44. Others of said panel such as a panel 42' has an outlet 42a' which permits a downward and outward circulation or discharge as indicated by the arrow 46. In this embodiment each panel 42 is provided with an exposed exterior panel face 48 and one or more transparent walled chambers disposed behind the front face 40a for selectively and alternatively receiving the characterizing fluid which will influence the characterization of the structural panel 40. In this embodiment a pump 50 is arranged in a line 52 and it may be selectively connected to one or more of a plurality of individual media supply tanks 54, 56 or 58 through valve controlled connection lines 60, 62 and 64 respectively. The media supply tanks 54, 56 and 58 advantageously comprise a fluid of a characteristic which may be desired for the wall structure 40 at any particular time. For example if the wall structure 40 is an interior wall it may be desired that the wall be such that it will have a blue appearance so that a blue dyed liquid is circulated through the wall structure 40 from one of the tanks containing such die such as the tank 54. If it is desired that the wall structure be dark and non-transparent then a black substance may be circulated from a tank 56. Each of the tanks 54, 56 and 58 may for example be connected to the return circulating line 46. The fluids in each of these tanks may be such that they may be mixed if necessary or they may be separated and suitable valving is provided where they should be separated. One of the tanks for example may contain a different color than the blue color and that may be circulated to change the color of ths wall and this may be done from day to day so that the wall will have a different color each day. When other type media are circulated such as the fluid to change the heat absorbing characteristics of the face of the panel or the heat repelling characteristics of such face then the tanks 54, 56 and 58 contain such medium. In those instances when a magnetic or an electronic or a magnetic attraction of the particles of the fluid medium is necessary suitable electronic or magnetic actuating means such as electronic coils or magnetic coils 60 are provided on the sides of the wall structures as shown schematically on one side of the wall structure 40. Such devices 60 advantageously comprise well known means for attracting particles of magnetic characteristics in a certain orientation to vary the transparency of the panel or wall structure or they may comprise electronic devices for orienting fibers such as so-called liquid fibers to provide the desired light transmission through the panels.

In the embodiment of the invention shown in FIGS. 4 and 5 there is provided a panel 64 which forms one element of a panel building structure similar to the structure shown in FIG. 3. Such a structure may be in the form of a glass block having an inlet 66 on one wall and an outlet 68 on another wall. Various glass block elements may be made up so that various combinations of arrangement of inlets and outlets with adjacent tiles may be made to form an overall wall structure. Advantageously both walls 70 and 72 of the glass block structure 64 are made transparent. Any characterizing medium may be circulated into an inlet as indicated by arrow 74 and out through an outlet of the block as desired. The medium which is circulated in the direction of the arrow 74 is advantageously one that will change the characteristic of the block 64 so that its appearance or its characteristics are changed as desired.

In the embodiment shown in FIG. 6 there is provided a solar collector generally designated 76 having at least one surface 78 which is transparent and which may be exposed to the sun or similar heating area for the purpose of receiving a quantity of heat. In this embodiment a heat transfer medium is circulated by a pump 80 from a supply tank 82 of such medium through a conduit 84 and into a heat transfer chamber 86 which is defined behind a characterizing chamber 88 which in this embodiment is located directly behind the exposed surface 78.

For the purpose of changing the characteristic of the solar collector 76 a medium is circulated through a connecting passage 90 from a pump 92 which may be selected connected through valving means 94 to one of a plurality of tanks 96 and 98. The tank 96 for example advantageously comprises a heat absorber which for example may be metal filings, liquid containing particles which will absorb heating rays, a gas having a heat absorbing characteristic for example a dark appearance. Tank 98 advantageously comprises a heat insulating medium which may for example be powdered asbestos, a darkened substance, a darkened sand, etc. Solar collector 76 may therefore be used in situations where it is desired to attract sun rays and heat an area by circulating a characterizing medium which will aid in the absorption of heat from the sun rays may be transferred to the heat transfer medium. On days when heating is not desired the heat absorbing characteristics may be changed so that little or no heat absorption is obtained by circulating a medium which will provide an insulation characteristic. In some instances it may be desired to receive the heat from the sun and use it for the purposes of machinery such as in cool weather but to prevent it from passing through the solar panel and into a room area and this may possibly be done by the circulating of a particular colored fluid through the chamber 88 which will not interfere with heat transfer to the chamber 86 but which will prevent the heat from passing through the whole structure and into a room area behind it for example.

Figure 7:
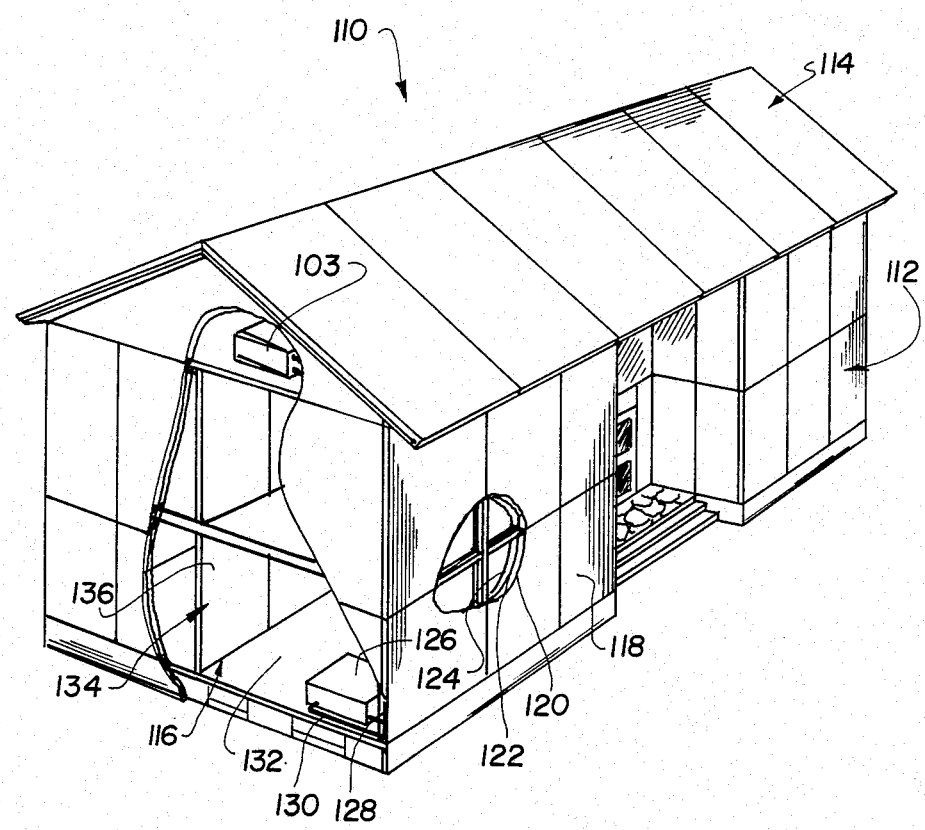
FIG. 7 is a perspecive view, partly broken away, of a building constructed in accordance with the invention.

As shown in the embodiment of FIG. 7 there is a building structure generally designated 110 which has a side wall 112 and a roof 114 and an interior wall 116. The building structure 110 advantageously includes a side wall 112 made up of a plurality of panels 118 each one of which has an exterior transparent wall 120 overlying a first interior cavity 122 directly adjacent the transparent wall 118 and an interior cavity 124 arranged inwardly of and directly adjacent the cavity 122. A pump 126 is disposed either in the building or alongside the building and it has a connection 128 through one of the cavities 124 or 122. The other of the cavities 124 or 122 is connected to means for circulating a heat transfer medium such as a liquid or other substance which may be used for heating or cooling. Pump 126 also has one or more connections to a storage tank or tanks 103 which supply it with a medium to be circulated through one of the chambers. This medium is one selected to change the color or the heat or light absorbing characteristics of selected ones of the panels 118. For example the whole color of the walls may be changed by selectively changing the panels 118 or any portion of the wall 112 may be changed by changing a selected panel. This change will result in a change of light or sun penetration into the interior such as into a room space 132. For example, on winter days the sun may be allowed to pass through the panels 118 by putting a clear fluid in the chamber 122 or 124 which will permit its passage into the room space 132. Alternatively the sun's rays may be reflected such as by circulating a medium which would cause a reflection of the rays or the heat from the rays may be absorbed by a heat absorbing substance which may be circulated through one of the chambers 122 or 124. In addition the interior of the walls for example on a wall 134 which is an interior wall may be connected to a pump such as the pump 126 for circulating a substance into one or more chambers of panels 136 which form such walls for the purpose of changing all or a part of the color of such walls.

The building structure 110 also includes panels in the roof 114 which are connected to a pump 138 for circulating substances which will change the light reflectiveness or heat absorption or reflection or blockage through the roof 114. Thus the invention provides a means for controlling the light at the interior of the house as well as the heating and/or cooling thereof by circulating a medium for controlling the sun's rays as well as by circulating mediums or fluids which may act in heat transfer for the purpose of either heating or cooling the walls as well as for using the substance circulated for heating or cooling another item of the house such as the hot water thereof.

While specific embodiments of the invention have been shown and described in detail to illustrate the application of the principles of the invention, it will be understood that the invention may be embodied otherwise without departing from such principles.

What is claimed is:

1. Building panel structure which may be interfitted with other panels to form a wall, comprising a structural member for both the interior and exterior of a building wall and roof, comprising outer, inner and intermediate substantially parallel spaced-apart transparent walls and a side, bottom and top wall interconnecting said outer and inner and intermediate walls and forming therewith an outer chamber between said intermediate wall and said outer wall and an inner chamber between said intermediate wall and said inner wall, an outlet and an inlet connected into each of said outer chamber and said inner chamber, media supply means of a material for selectively changing light transmission, heat transmission, color and appearance of said panel associated with said panel and having a discharge connectible with said inlet to at least one of said chambers and a return connectible to said outlet of the associated chamber, and heat transfer media means connectible to the other of said chambers for conditioning the interior of the building.

2. A building structure according to claim 1, wherein said means for circulating a fluid comprises means for regulating which portions of the house would have the light from the exterior of the house pass therethrough and which would prevent the light from passing therethrough.

3. Building panel structure wherein said media supply means comprises one of liquid, a gas, and a flowable solid.

4. A building panel structure according to claim 1, wherein said media supply means comprises an inlet fitting projecting from one of said walls, and an outlet recess defined in another of said walls, said recess and said projection being defined as interfitting elements for adjacent blocks.

5. A building panel according to claim 4, having a circulating system connected to said inlet and said outlet, said circulating system having a plurality of separate media tanks and means for circulating a selected one of said media through said at least one chamber.

6. A building structure comprising exterior walls, interior walls within said exterior walls and a roof overlying said interior and exterior walls, at least one of said walls comprising a panel having outer, inner and intermediate substantially parallel spaced-apart transparent walls and a side, bottom and top wall interconnecting said outer and inner and intermediate walls and forming therewith an outer chamber between said intermediate wall and said outer wall and an inner chamber between said intermediate wall and said inner wall, an outlet and an inlet connected into each of said outer chamber and said inner chamber, media supply means of a material for selectively changing light transmission, heat transmission, color and appearance of said panel associated with said panel and having a discharge connectible with said inlet to at least one of said chambers and a return connectible to said outlet of the associated chamber, and heat transfer media means connectible to the other of said chambers for conditioning the interior of the building.

7. A method of controlling the appearance and lighting of a building having a transparent exterior portion, a transparent interior wall portion within the exterior, and a transparent roof portion, and in using at least one wall defining at least an inner and outer aligned transparent chambers one behind the other, and comprising directing a flowable media through one of the chambers in a quantity and of a characteristic to selectively control the amount of sun light and light passing through the chambers and the color and appearance of the panel and the amount of light which will pass into the interior rooms of the building and circulating a heat transfer media through other of said chambers which will not interfere with the selective control of the flowable media.

8. A method according to claim 7, wherein, in respect to the interior wall, a media is circulated to change the appearance of the wall.

9. A method according to claim 7, wherein a colored medium is circulated to change at least a portion of said interior wall.

10. A method according to claim 7, wherein in respect to an exterior and roof wall, a heat insulating medium is circulated through the chamber.

11. A building comprising a building structure having side walls, end walls, interior dividing walls and a roof, each of said walls having at least an exposed wall portion which is transparent and each having wall means defining at least two chambers behind and in alignment with said transparent exposed wall portion, and control means for circulating a control medium through at least one of said chambers for selectively varying the heating, lighting and appearance of the walls, air conditioning and means for circulating a second media through the other of said chambers.

* * * * *